(12) United States Patent
Murakata

(10) Patent No.: US 8,049,923 B2
(45) Date of Patent: Nov. 1, 2011

(54) METHOD AND APPARATUS FOR IMAGE PROCESSING CAPABLE OF EFFICIENTLY INTERFACING WITH DIFFERENT DIGITAL SIGNAL PROCESSORS

(75) Inventor: Akira Murakata, Tokyo-to (JP)

(73) Assignee: Ricoh Company Ltd., Tokyo (JP)

( * ) Notice: Subject to any disclaimer, the term of this patent is extended or adjusted under 35 U.S.C. 154(b) by 968 days.

(21) Appl. No.: 11/442,261

(22) Filed: May 30, 2006

(65) Prior Publication Data

US 2007/0002064 A1 Jan. 4, 2007

(30) Foreign Application Priority Data

May 31, 2005 (JP) ................................. 2005-159616

(51) Int. Cl.
*G06F 15/00* (2006.01)

(52) U.S. Cl. ......... 358/1.9; 358/451; 358/162; 358/444; 345/574; 365/201; 710/49

(58) Field of Classification Search .................... 358/1.9, 358/451, 162, 444; 345/574; 365/201; 710/49
See application file for complete search history.

(56) References Cited

U.S. PATENT DOCUMENTS

| | | | |
|---|---|---|---|
| 4,523,276 | A | 6/1985 | Maejima et al. |
| 5,295,000 | A | 3/1994 | Nonoshita et al. |
| 5,473,595 | A | 12/1995 | Hayashi et al. |
| 6,052,479 | A * | 4/2000 | Hiraishi et al. ............... 382/162 |
| 6,298,364 | B1 * | 10/2001 | Kanekura ..................... 708/490 |
| 2003/0137695 | A1 | 7/2003 | Nomizu |
| 2003/0223297 | A1 * | 12/2003 | Fukuyama .................... 365/201 |
| 2004/0122997 | A1 * | 6/2004 | Diamant ........................ 710/49 |
| 2004/0199558 | A1 * | 10/2004 | Aldrich et al. ................ 708/230 |
| 2006/0152778 | A1 * | 7/2006 | Kim .............................. 358/540 |

FOREIGN PATENT DOCUMENTS

| | | |
|---|---|---|
| EP | 0 671 719 | 9/1995 |
| EP | 1 120 958 | 8/2001 |
| JP | 6-168212 | 6/1994 |
| JP | 07 262010 | 10/1995 |
| JP | 3152198 | 1/2001 |
| JP | 2002-010277 | 1/2002 |
| JP | 2004-070656 | 3/2004 |
| JP | 2004-086416 | 3/2004 |

OTHER PUBLICATIONS

U.S. Appl. No. 11/442,261, filed May 2006, Murakata.*
International Search Report Report dated Jul. 6, 2006.
Office Action for Japanese patent application No. 2005-159616 dated Aug. 3, 2010.

* cited by examiner

*Primary Examiner* — Twyler L Haskins
*Assistant Examiner* — Michael Burleson
(74) *Attorney, Agent, or Firm* — Harness, Dickey & Pierce, P.L.C.

(57) ABSTRACT

An image processing apparatus includes a signal input mechanism, a signal output mechanism and a control device. The control device controls a writing of data received from the signal input mechanism and outputs the data to a plurality of digital signal processors for image processing through the signal output mechanism. The control device includes a decision mechanism and a write administration mechanism. The decision mechanism is configured to decide data to be written to the plurality of digital signal processors. The write administration mechanism is configured to administrate writing operations of the data decided by the decision mechanism to be written relative to the plurality of digital signal processors.

16 Claims, 4 Drawing Sheets

METHOD AND APPARATUS FOR IMAGE PROCESSING CAPABLE OF EFFICIENTLY INTERFACING WITH DIFFERENT DIGITAL SIGNAL PROCESSORS

PRIORITY STATEMENT

This patent specification is based on Japanese patent application, No. JPAP2005-159616 filed on May 31, 2005 in the Japan Patent Office, the entire contents of which are hereby incorporated herein by reference.

BACKGROUND

1. Field

The present invention generally relates to a method and/or apparatus for image processing. More particularly, it may relate to a method and/or apparatus such as a printer, a scanner, a copier, a facsimile communication device, a digital multifunction peripheral (MFP), a digital camera, etc. for image processing capable of controlling a writing of data relative to a plurality of digital signal processors.

2. Background Art

A microprocessor called a digital signal processor (DSP) has been provided in a variety of background electric devices so as to process data including an image and voice. In recent years, a performance capability of the DSP has improved dramatically so that large quantities of the data tend to be processed in a short period of time. Particularly, the DSP specialized in image processing has shown a remarkable improvement in the performance capability, and has been used in a variety of areas including a copier and a digital camera, for example.

The DSP has different types depending on a number of bits of data to be written at a time. For example, the DSP corresponding to 8 bits or 16 bits of data to be written or selectively corresponding to both the 8 bits and 16 bits to be written by switching a certain setting is known.

In a case where the DSP is installed in the electric device, an appropriate DSP may be used in consideration of the performance capability thereof or wiring on a circuit substrate, for example.

SUMMARY

In at least one embodiment of the invention, a novel image processing apparatus is capable of controlling data to be output to a digital signal processor. In one example embodiment, a novel image processing apparatus includes a signal input mechanism, a signal output mechanism and a control device. The control device controls a writing of data received from the signal input mechanism and outputs the data to a plurality of digital signal processors for image processing through the signal output mechanism. The control device includes a decision mechanism and a write administration mechanism. The decision mechanism configured to decide data to be written to the plurality of digital signal processors. The write administration mechanism configured to administrate writing operations of the data decided by the decision mechanism to be written relative to the plurality of digital signal processors.

In at least one embodiment of the invention, a novel control device is capable of controlling data to be output to a digital signal processor. In one example embodiment, a novel control device controlling a writing of data relative to a plurality of digital signal processors. The control device includes a decision mechanism configured to decide data to be written relative to the plurality of digital signal processors. The control device also includes a write administration mechanism configured to administrate writing operations of the data decided by the decision mechanism to be written relative to the plurality of digital signal processors.

BRIEF DESCRIPTION OF THE DRAWINGS

A more complete appreciation of the disclosure and many of the attendant advantages thereof will be readily obtained as the same becomes better understood by reference to the following detailed description of example embodiments when considered in connection with the accompanying drawings, wherein.

DETAILED DESCRIPTION OF EXAMPLE EMBODIMENTS

Figure 1:
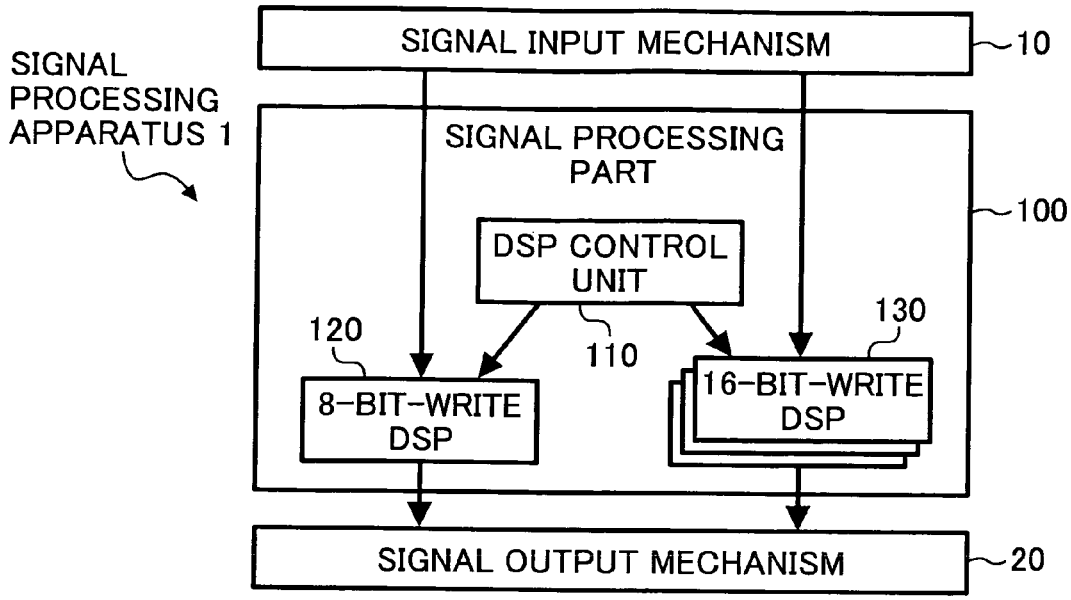
FIG. 1 is a diagram illustrating a configuration of a signal processing apparatus according to an example embodiment of the present invention.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referring now to the drawings, wherein like reference numerals designate identical or corresponding parts throughout the several views, particularly to FIG. 1, a description is made for a signal processing apparatus 1 which includes a control device (here, a DSP control unit 110) of an example embodiment of the present invention.

Figure 4:
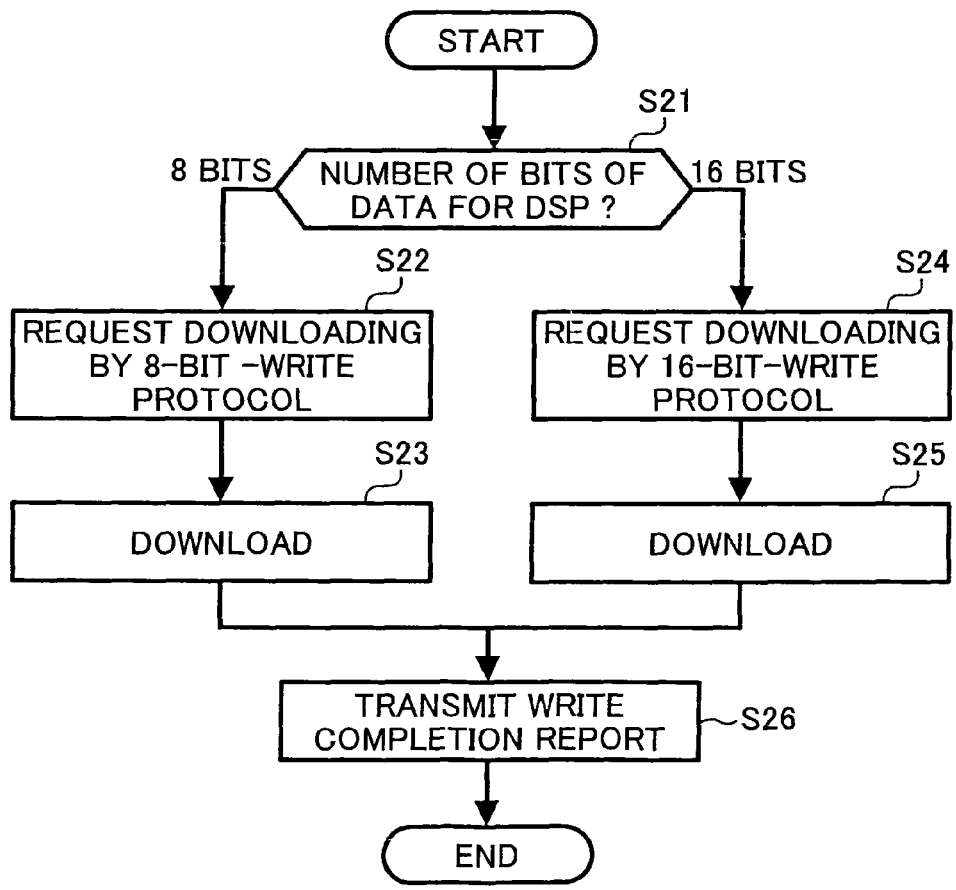
FIG. 4 is a flowchart for explaining an example procedure of a download administration unit included in the DSP control unit of FIG. 2.

An example embodiment of the present invention is described with FIG. 1 though FIG. 4.

Referring to FIG. 1, a configuration of the signal processing apparatus 1 includes a signal input mechanism 10, a signal processing part 100, and a signal output mechanism 20. The signal processing part 100 includes a DSP control unit 110, a 8-bit-write DSP 120, and a 16-bit-write DSP.

In the signal processing apparatus 1, a data signal is input from the signal input mechanism 10, then is processed in the signal processing part 100, and is output from the signal output mechanism 20. For example, in a particular configuration, image data obtained by a scanner which reads an original document or image data obtained by an imaging mechanism which takes an image of a subject is input to the signal input mechanism 10 in which image processing such as a filter or gamma correction and an error diffusion is performed to the image data. Then, the image data is output from the signal output mechanism 20 to a controller board (not shown) so that processing such as accumulation, printing, and facsimile transmission may be performed.

For example, in another configuration, image data stored in a memory mechanism such as a HDD (Hard Disk Drive) is input to the signal input mechanism 10, and then a signal processing is performed on the image data by the signal processing part 100 so that the processing such as accumulation, printing, and facsimile transmission is performed. In such cases, the signal processing part 100 may be configured as an IPU (Image Processing Unit) board in an image processing apparatus such as a scanner, a printer, a copier, a facsimile communication device, a digital camera, and an MFP. The MFP includes functions of the scanner, the printer, the copier, and the facsimile communication device.

In the signal processing part 100, the 8-bit-write DSP 120 and the 16-bit-write DSP 130 are in charge of the signal processing. Here, "8-bit-write" of the 8-bit-write DSP 120 and "16-bit-write" of the 16-bit-write DSP 130 respectively indicate 8 bits and 16 bits of data to be written to the DSP at a time. In FIG. 1, a plurality of the 16-bit-write DSPs 130 are disposed in the signal processing part 100 so that the signal processing is basically performed by 16 bits. However, the 8-bit-write DSP 120 is used in an area that has a limited space for 16 data lines to be routed.

The DSP control unit 110 as the control device in the signal processing part 100 includes a driver function which is set by writing a program or a parameter used for the signal processing to each DSP 120 and 130.

Figure 2:
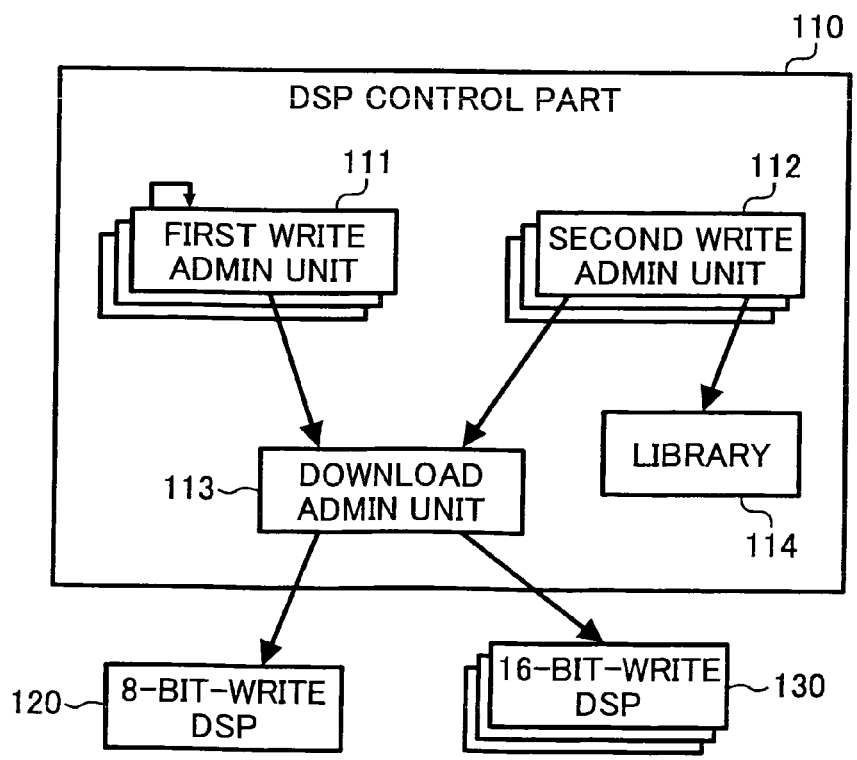
FIG. 2 is a more detailed diagram illustrating a configuration of a DSP control unit included in the signal processing apparatus of FIG. 1.

Referring to FIG. 2, the DSP control unit of FIG. 1 is illustrated in detail. The DSP control unit 110 includes first and second write administration units 111 and 112, a download administration unit 113, and a library 114.

The first and the second write administration units 111 and 112 act as decision mechanisms configured to decide data such as a program or a parameter to be written to each DSP 120 and 130. The first and the second write administration units 111 and 112 also decide the program or the parameter corresponding to each predetermined processing module including an image processing module such as a filter, variable magnification, and error diffusion in a case of image processing.

The program or the parameter may be determined according to a set content such as an original document mode including a letter and a photo, a variable magnification ratio, and notch (i.e., density of the original document). Information on the set content is obtained by an apparatus installing the signal processing apparatus by detecting operation of an operation part or receiving from an external part, and then is supplied to the DSP control unit 110. Consequently, the information on the set content is obtained by each write administration unit 111 and 112 so as to be used for decision on whether the program or the parameter.

Also, a part of the program or the parameter is a fixed value, thereby a content to be written may be decided by the second write administration unit 112 which refers to the library 114. The library 114 stores an assembler being an image processing program used by the DSP which is changed to a base 16 number in a data arrangement or a value being a processing parameter.

On the other hand, a content including a value such as a frame gate (FGATE) setting which is specific to a device or a reading image size is decided by calculation conducted by the first write administration unit 111 without referring to the library 114.

Once which type of the data to be written to which DSP is determined, the first and the second write administration units 111 and 112 request a writing to the download administration unit 113.

The download administration unit 113 is a write administrative mechanism configured to administrate writing operations of the data to be written relative to the DSP in response to the request from the first and the second write administration units 111 and 112. Here, as target DSPs to which the data to be written includes the 8-bit-write DSP 120 and the 16-bit-write DSP 130, the download administration unit 113 selects an appropriate driver depending on the target DSP either the 8-bit-write DSP 120 or the 16-bit-write DSP 130. Thereby, the download administration unit 113 requests the target DSP either the DSP 120 or the DSP 130 to download the data by using the driver. The administration for the writing operations of the data to the DSP includes such selection of a protocol.

Therefore, data which is necessary for processing a digital signal input from the signal input mechanism 10 of FIG. 1 is written to a suitable DSP so that the DSP control unit 110 may prepare a state where the digital signal input from the signal input mechanism 10 is processed.

Figure 3:
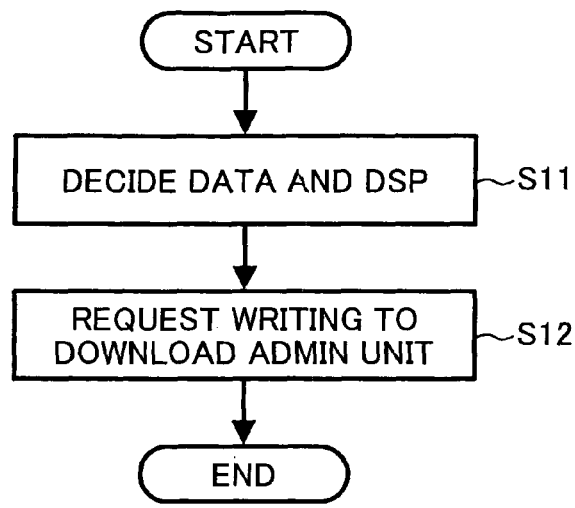
FIG. 3 is a flowchart for explaining an example procedure of first and second write administration units included in the DSP control unit of FIG. 2.

Referring to FIG. 3 and FIG. 4, example procedures of the DSP control unit including the first and the second write administration units 111 and 112 and the download administration unit 113 are illustrated in flowcharts. Such procedures may be implemented by a hardware or a software which is executed by a processor.

In FIG. 3, the flowchart explains the example procedure of the first and the second write administration units 111 and 112. The procedure is generalized in FIG. 3, however, a procedure such as FIG. 3 is prepared for each write administration unit in an actual case.

When the DSP becomes necessary to be set in response to a request such as the signal processing from the external part, the processor starts the procedure of FIG. 3. In a step S11, the data to be written to the DSP and the DSP to which the data to be written are decided. The data is decided by the second write administration unit 112 with referring to the library 114 or by a suitable calculation conducted by the first write administration unit 111 without referring to the library 114. In a next step S12, the writing of data to the DSP based on a decision of the step S11 is requested to the download administration unit 113, and then the procedure is ended.

In FIG. 4, the flowchart explains the example procedure of the download administration unit 113. After the step S12 of FIG. 3, a procedure of FIG. 4 is started regardless of which write administration unit is applied in FIG. 3.

In a step S21 of FIG. 4, a number of bits of data corresponding to the DSP to which the data to be written is determined. Information on the number of bits corresponding to each DSP to which the data to be written may be obtained by the download administration unit 113 as may be needed. Thereby, the information and identification information (e.g., a number) of the DSP which is requested for the data to be written may determine the number of bits of data in the step S21. Here, the signal processing part 100 has the 8-bit-write DSP 120 and the 16-bit-write DSP 130 as the DSPs. Consequently, a result determined by the step S21 is either 8 bits or 16 bits.

In a case where the result determined by the step S21 is the 8 bits, the procedure continues at a step S22 where a downloading of the data to the DSP is requested by an 8-bit-write protocol, and then the downloading is executed by a following step S23. On the other hand, in a case where the result determined by the step S21 is the 16 bits, the procedure continues at a step 24 where a downloading of the data to the DSP is requested by a 16-bit-write protocol, and then the downloading is executed by a step S25. Once the downloading is completed, the procedure continues at a step 26 where a write completion report is transmitted to a write requester, and then the procedure is ended.

In the steps S23 and S25, the download administration unit 113 may write the data to the DSP, or the DSP may read the data from the download administration unit 113. The write completion report may be directly transmitted to the write administration units 111 and 112.

Therefore, the writing of data such as the program or the parameter which is necessary for execution of the signal processing is performed to each DSP 120 and 130 according to the above procedure.

In this case, the download administration unit 113 administrates a direct access to the DSP. Thereby, the write administration units 111 and 112 may not necessarily recognize a size of data to be written to the DSP by bit or a type of the protocol to be used. Therefore, a selection of the protocol may not be necessary with respect to each write administration unit 111 and 112 so that a time consumed for development or administration may be reduced.

Further, as long as the download administration 113 administrates the information on which the protocol is applied for requesting the downloading with respect to a designated DSP to which the data to be written, an appropriate writing may be performed without grasping the data content.

Therefore, in a case where DSPs with different size of bits to be written at a time are simultaneously used, the writing of data may be easily controlled.

In a case where the number of bits to be written to the DSP is changed due to, for example, a design change of the signal processing part 100, the data may be written to the DSP. This may be achieved by allowing the download administration unit 113 to correspond to a protocol for writing a new number of bits so that a burden incurring during the design change may be reduced. Therefore, in a case where the design change of the write administration unit 111 and 112 is necessary, the design change is applied to a part requesting the writing to the download administration unit 113.

Further, the protocol for writing data to the DSP is required to be suitable for a type of the DSP. However, the download administration unit 113 may be commonly used as long as the write administration units 111 and 112 are configured with transmitting an appropriate request to the download administration unit 113 in a case where the write administration unit 111 and 112 to be disposed are different types or models, for example. Also, the write administration units 111 and 112 may be easily diverted to another model as modules. Therefore, an existing development may be easily diverted to another model so that a development efficiency is improved.

Such effect is obtained because at least the first and second write administration units 111 and 112 and the download administration unit 113 are functionally separated for disposition. Such separation may be implemented by differentiating between codes of the first and second write administration units 111 and 112 and the download administration unit 113 by using different classes, for example, when a source code of a C++ language is created. Also, it is possible to implement the functional separation by using logically separable modules of the first and second write administration units 111 and 112 and the download administration unit 113. There is no differences in effects, regardless of whether such module is made of hardware or software.

Figure 5:
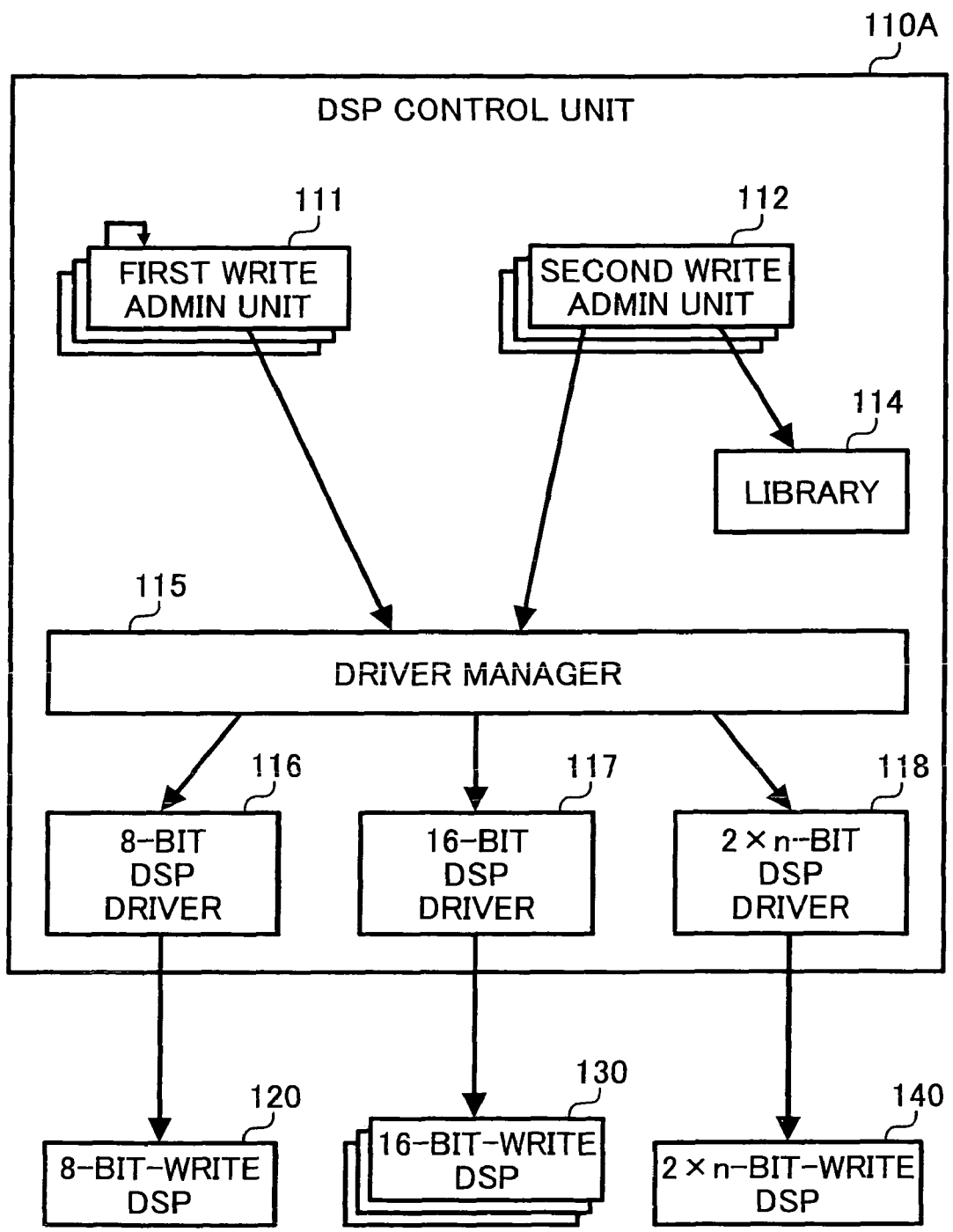
FIG. 5 is diagram illustrating a DSP control apparatus according to another example embodiment of the present invention, corresponding to FIG. 2.
Figure 6:
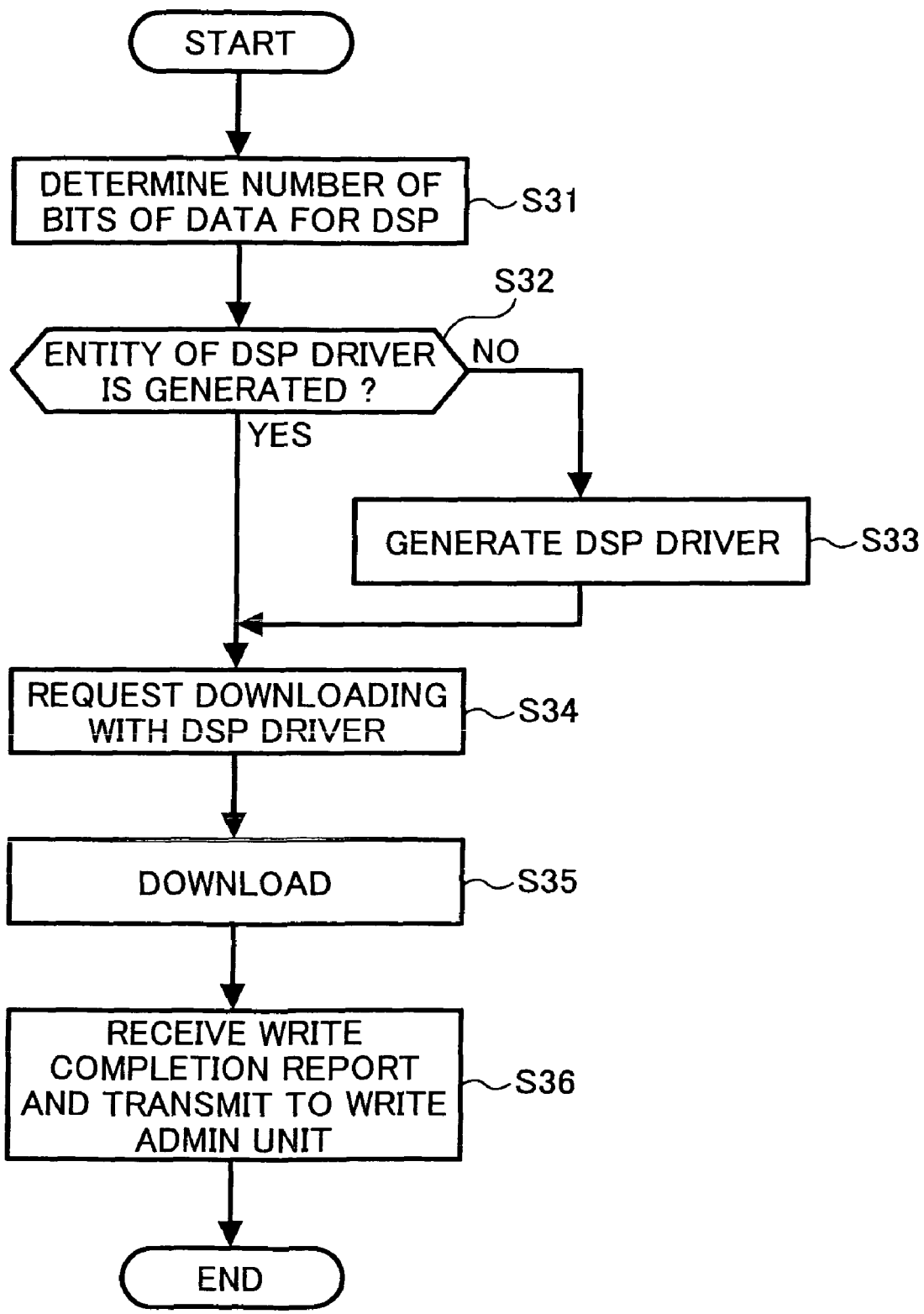
FIG. 6 is a flowchart for explaining an example procedure of a driver manager and each DSP driver included in the DSP control apparatus of FIG. 5.

Another example embodiment of the control device of the present invention is described with FIG. 5 and FIG. 6. In this example embodiment, an illustration of an example configuration of the control device having the signal processing apparatus is omitted. However, the example configuration is similar to FIG. 1, and differences are a 2× n-bit-write DSP 140 which is disposed in addition to the 8-bit-write DSP 120 and the 16-bit-write DSP 130 as the DSPs and a configuration of the DSP control unit.

Referring to FIG. 5, the configuration of the DSP control unit relevant to the control device of the another example embodiment is illustrated.

In FIG. 5, a DSP control unit 110A includes the first and the second write administration units 111 and 112 and the library 114 of FIG. 2, a driver manager 115, a 8-bit-DSP driver 116, a 16-bit-DSP driver 117, a 2× n-bit-DSP driver 118 instead of the download administration unit 113 of FIG. 2. The 2× n-bit-DSP driver 118 may be disposed to correspond to a plurality of n types. This n is an optional natural number.

The DSP drivers 116, 117, and 118 are control mechanisms having functions of downloading by requesting the downloading of data to the DSP to which the data to be written by respective 8-bit, 16-bit, and 2× n-bit write protocols. Thereby, the data is respectively written to the 8-bit-write DSP 120, the 16-bit-write DSP 130, and a 2× n-bit-write DSP 140 which may be disposed.

The driver manager 115 includes a function of the writing of data to the DSP in accordance with the request from each write administrative part 111 and 112 by using an appropriate driver which corresponds to a number of bits to be written to the DSP.

In contrast to the DSP control unit 110 of FIG. 2, the driver manager 115 is disposed as a request receiver of the writing so that all the DSP drivers 116, 117, and 118 may not be constantly activated. For example, in a case where a function of the DSP control unit 110A is implemented by a C++ language software, each DSP driver 116, 117, and 118 is prepared as a class, and the driver manager 115 administrates an address of each class so that a driver to be used may be operated by generating an entity from the class when the DSP driver is used. The entity once generated may be saved for repetitively using afterwards or deleted when becoming unnecessary.

Therefore, the driver manager 115 acts as a facade receiving the request of the writing from each write administration unit 111 and 112, and also as a manager selecting and using the DSP driver in accordance with the request.

Referring to FIG. 6, a flowchart explains an example procedure of corresponding to the driver manager 115 and functions of the DSP driver 116, 117, and 118 included in the DSP control unit 110A of FIG. 5. The functions and the corresponding procedure of the write administration units 111 and 112 are similar to the example embodiment of FIG. 3 except the drive manager 115 to which the writing of data is requested. Thereby, an illustration and an explanation are omitted.

The processor of the DSP control unit 110A starts the procedure of FIG. 6 after the step S12 of FIG. 3 is conducted to the driver manager 115. In a step S31, a number of bits of data corresponding to the DSP to which the data to be written is determined. Information on the number of bits corresponding to each DSP to which the data to be written may be obtained by the driver manager 115 as may be needed. Thereby, the information and identification information (e.g., a number) of the DSP which is requested for data to be written may determine the number of bits of data. A result determined by the step S31 is, for example, 8 bits, 16 bits, or 2× n bits.

In a step 32, a DSP driver used for writing the number of bits of data is identified whether or not the entity thereof is generated. If the entity is not generated, the procedure continues at a step 33 for generation. In either case, the procedure continues at a step 34 where the downloading of data is requested to the DSP to which the data to be written with the DSP driver used for writing. Then, in a step S35, the downloading of data to the DSP is executed by using the corresponded protocol as similar to the step S23 of FIG. 4.

Upon completion of the step S35, the write completion report is received from the DSP driver, and is transmitted to the write administration unit so that the procedure is ended in a step S36.

Therefore, the data such as the program or the parameter which is necessary for the signal processing may be written to each DSP 120, 130, and 140 according to the above procedure. Consequently, in addition to the similar effect of the example embodiment stated previously, a hardware resource may be economically saved because the DSP driver of the number of bits unused is not necessarily activated. This is particularly effective in a case where the DSP control unit is corresponded to a variety of the number of bits types.

The foregoing disclosure and description of the example embodiments are illustrative only and are not to be considered limiting.

Now, example transformation embodiments are explained. For example, the DSP control unit 110 is not necessarily disposed on a same substrate on which the DSP is disposed, and one of or all of the functions of the DSP control unit 110 may be implemented by another CPU (e.g., a main CPU) of a device mounting the signal processing part 100.

The number of bits of data to be written to the DSP at a time may be changed by switching a setting. In such case, the download administration unit 113 or the driver manager 115 may select an appropriate protocol corresponding to the setting at a point of the writing.

When the DSP control unit 110 such as stated above is disposed to the image processing apparatus including the scanner, the printer, copier, the facsimile communication device, the digital camera, and the MFP so that the writing of data to the DSP is controlled, ease of controlling the writing of data or reduction of the burden incurring during the design change may be implemented as the apparatus as a whole.

Also, the data to be process by the DSP is not limited to the image data. In such case, the DSP control unit may be disposed in an electronic device in addition to the image processing apparatus.

Further, the above example embodiments and transformation embodiments may be combined without inconsistency for an application.

Therefore, as described above, according to the control device or the image processing apparatus of at least one embodiment of the present invention, in a case where the DSPs with different number of bits of data to be written at a time are simultaneously used, the writing of data to the DSPs may be easily controlled.

Thereby, the burden of the operation or the development for the writing of data to the DSP may be reduced so that a cost of the apparatus using the DSP may be reduced by applying at least one embodiment of the present invention.

Numerous additional modifications and variations are possible in light of the above teachings. It is therefore to be understood that within the scope of the appended claims, the disclosure of this patent specification may be practiced otherwise than as specifically described herein.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDS; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An image processing apparatus, comprising:
   a signal input mechanism;
   a signal output mechanism; and
   a control device in the image processing apparatus, the control device configured to control a writing of data received from the signal input mechanism and to output the data to a plurality of digital signal processors for image processing through the signal output mechanism, the control device including
   a decision mechanism configured to decide data to be written to the plurality of digital signal processors;
   a write administration mechanism configured to administrate writing operations of the data decided by the decision mechanism to be written relative to the plurality of digital signal processors; and
   a plurality of control mechanisms configured to be selectively used to control respective writing operations of the data to be written at a time using respective n-bit write according to the plurality of digital signal processors which handle data to be written at a time with different number of bits.

2. The image processing apparatus of claim 1, wherein the write administration mechanism is arranged independently from the decision mechanism.

3. A control device to control a writing of data relative to a plurality of digital signal processors, comprising:

a decision mechanism configured to decide data to be written relative to the plurality of digital signal processors; and a write administration mechanism configured to administrate writing operations of the data decided by the decision mechanism to be written relative to the plurality of digital signal processors based on a bit size of a respective digital signal processor, wherein the write administration mechanism includes a plurality of control mechanisms configured to be selectively used to control the respective writing operations of the data to be written at a time using respective n-bit write according to the plurality of digital signal processors which handle data to be written at a time with different number of bits.

4. The control device of claim 3, wherein the plurality of control mechanisms are configured to control the writing operations respectively in 8 bits, 16 bits and 2×n bits of data to be written at a time, where n is a natural number.

5. A control device to control a writing of data relative to a plurality of digital signal processors, comprising:

means for deciding data to be written relative to the plurality of digital signal processors; and means for administrating writing operations of the data decided by the means for deciding to be written relative to the plurality of digital signal processors based on a bit size of a respective digital signal processor, wherein a plurality of control mechanisms configured to be selectively are used to control the respective writing operations of the data to be written at a time using respective n-bit write according to the plurality of digital signal processors which handle data to be written at a time with different number of bits.

6. A method of selectively controlling respective writing operations of data to be written at a time with different number of bits, comprising:

deciding data to be written to a plurality of digital signal processors and deciding the digital signal processors to which the data is to be written based on a bit size of a respective digital signal processor;

requesting a writing of the data to a download administration unit based on decided data and digital signal processors;

determining a number of bits of the data corresponding to the digital signal processors;

requesting a downloading of the data to the digital signal processors with respective protocols determined based on the number of bits of the data;

executing the downloading of the data; and transmitting a write completion report to a write requestor, wherein the writing of the data includes selective control of respective writing operations of the data to be written at a time using a respective n-bit write according to the plurality of digital signal processors which handle data to be written at the time with respective numbers of bits.

7. The image processing apparatus of claim 1, further comprising a signal processing part, wherein the control device, the decision mechanism and the write mechanism are on the signal processing part.

8. The image processing apparatus of claim 7, wherein the signal processing part is configured as an Image Processing Unit (IPU) board.

9. The control device of claim 3, further comprising a library operatively connected to the decision mechanism.

10. The control device of claim 3, further comprising a signal processing part, wherein the control device, the decision mechanism and the write mechanism are on the signal processing part.

11. The control device of claim 3, wherein the signal processing part is configured as an Image Processing Unit (IPU) board.

12. The image processing apparatus of claim 1, further comprising a driver manager and a plurality of digital signal processor drivers.

13. The image processing apparatus of claim 1, further comprising a signal processing part, wherein the driver manager and the plurality of digital signal processor drivers are on the signal processing part.

14. The control device of claim 3, further comprising a signal processing part, wherein the driver manager and the plurality of digital signal processor drivers are on the signal processing part.

15. The method according to claim 6, further comprising generating a digital signal processor driver, and requesting the downloading of the data with the digital signal processor driver.

16. The method according to claim 3, wherein the write administration mechanism is configured to administrate a direct access to the plurality of digital signal processors by the decision mechanism.

* * * * *